United States Patent [19]

Kokuryu et al.

[11] Patent Number: 5,372,163
[45] Date of Patent: Dec. 13, 1994

[54] REINFORCED HOSE

[75] Inventors: Yuji Kokuryu; Keiichi Kodama, both of Inazawa, Japan

[73] Assignee: Toyoda Gosei Co., Ltd., Nishikasugai, Japan

[21] Appl. No.: 222,006

[22] Filed: Apr. 4, 1994

Related U.S. Application Data

[63] Continuation of Ser. No. 880,421, May 8, 1992, abandoned.

[30] Foreign Application Priority Data

May 10, 1991 [JP] Japan .................. 3-105857

[51] Int. Cl.⁵ ............................... F16L 11/00
[52] U.S. Cl. .................... 138/126; 138/137; 138/153
[58] Field of Search ............... 138/124, 126, 137, 141, 138/153

[56] References Cited

U.S. PATENT DOCUMENTS

| | | | |
|---|---|---|---|
| 1,455,359 | 5/1923 | Schulthess | 138/126 |
| 1,798,798 | 3/1931 | Leguillon | 138/126 |
| 3,605,818 | 9/1971 | Balchan | 138/126 |
| 3,750,712 | 8/1973 | Brand | 138/124 |
| 4,111,237 | 9/1978 | Mutzner et al. | |
| 4,130,139 | 12/1978 | Haren | 138/137 |
| 4,585,035 | 4/1986 | Piccoli | 138/126 |
| 4,870,995 | 10/1989 | Igarashi et al. | 138/124 |
| 4,998,565 | 3/1991 | Kokuryu et al. | |

Primary Examiner—Timothy F. Simone
Assistant Examiner—James F. Hook
Attorney, Agent, or Firm—Cushman, Darby & Cushman

[57] ABSTRACT

A reinforced hose has an inner tube made of rubber, an inner reinforcing layer made of aromatic polyamide yarn formed on the inner tube, an intermediate layer made of rubber formed on the inner reinforcing layer, an outer reinforcing layer made of synthetic yarn formed on the intermediate layer which has a heat shrinkage ratio at dried condition of over about 0.5% due to the temperature of a curing process, and a covering layer made of rubber being formed on the outer reinforcing layer. By providing the inner reinforcing layer of aromatic polyamide yarn, the reinforced hose of the present invention has a high stretching strength. Furthermore, by making the outer reinforcing layer of synthetic yarn, which has a heat shrinkage ratio at dried condition of over about 0.5% due to the temperature of a curing process, the reinforced hose of the present invention can hardly be expanded by the pressure of inside fluid.

11 Claims, 2 Drawing Sheets

REINFORCED HOSE

This is a continuation of application Ser. No. 07/880,421, filed on May 8, 1992, which was abandoned upon the filing hereof.

BACKGROUND OF THE INVENTION

1. Field of the Invention

The present invention relates to a reinforced hose and, more particularly, to a hose reinforced by strands and used in a hydraulic circuit, such as a water hose, an oil hose, a brake hose, or a fuel hose in vehicles.

2. Description of Related Art

Technical arts for a reinforced hose are already disclosed in U.S. Pat No. 4,111,237 and U.S. Pat. No. 4,998,565. In these patents, the reinforced hose, as shown in FIGS. 3 and 4, has an inner tube 91 made of rubber, an inner reinforcing layer 92 formed on the inner tube 91 by strands 921, an intermediate layer 93 made of rubber formed on the inner reinforcing layer 92, an outer reinforcing layer 94 formed on the intermediate layer 93 by strands 941, and a covering layer 95 made of rubber formed on the outer reinforcing layer 94. This type of reinforced hose is usually used for transferring high pressured fluid and/or transmitting high pressure in the hydraulic circuit, for example, such as in an oil hose.

Recently, in order to increase the stretching strength to reduce expansion and to increase the heat durability of hoses, the strands of both the inner and outer reinforcing layers have been made of aromatic polyamide type yarn. Therefore, these reinforced hoses have good performance for a bursting pressure over 2,300 kg/cm$^2$. However, as the aromatic polyamide type yarn is hard to shrink, but the inner tube 91 and the intermediate layer 93, because they are made of rubber, are shrunk by the heat of a curing process. A small gap is formed between the inner tube 91 and the inner reinforcing layer 92, and between the intermediate layer 93 and the outer reinforcing layer 94. As a result, the inner tube 91 will expand due to the pressure of inside fluid. The pressure in conventional reinforced hoses having 3.1 mm in diameter vs. expansion of the hose is shown in FIG. 2. In accordance with this graph, these types of conventional reinforced hoses have a large volume of expansion under any given pressure of up to 100 kg/cm$^2$ which is usually used. Therefore, conventional reinforced hoses sometimes cause an insufficient response time in a hydraulic circuit since expansion slows the fluid effect.

SUMMARY OF THE INVENTION

It is an object of the present invention to overcome the above problems by providing a reinforced hose having sufficient stretching strength and a small volume of expansion under a pressure from sufficiently low up to sufficiently high for use in various hydraulic circuits in a vehicle.

In accordance with the present invention, a reinforced hose comprises an inner tube made of rubber, an inner reinforcing layer of at least one strand made of aromatic polyamide type yarn, an intermediate layer made of rubber formed on the inner reinforcing layer, an outer reinforcing layer formed on the intermediate reinforcing layer by at least one strand made of synthetic yarn which has a heat shrinkage ratio of over 0.5% in a dried condition due to the temperature of the curing process, and a covering layer made of rubber formed on the outer reinforcing layer.

By providing the inner reinforcing layer formed by strands made of aromatic polyamide type yarn, the reinforced hose of the present invention has a high stretching strength. Furthermore, by providing the outer reinforcing layer formed by strands made of synthetic yarn which has a heat shrinkage ratio of over about 0.5% in a dried condition due to the temperature of a curing process, the reinforced hose of the present invention can be expanded much less than conventional hoses by the pressure of inside fluid.

Other objects, features and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
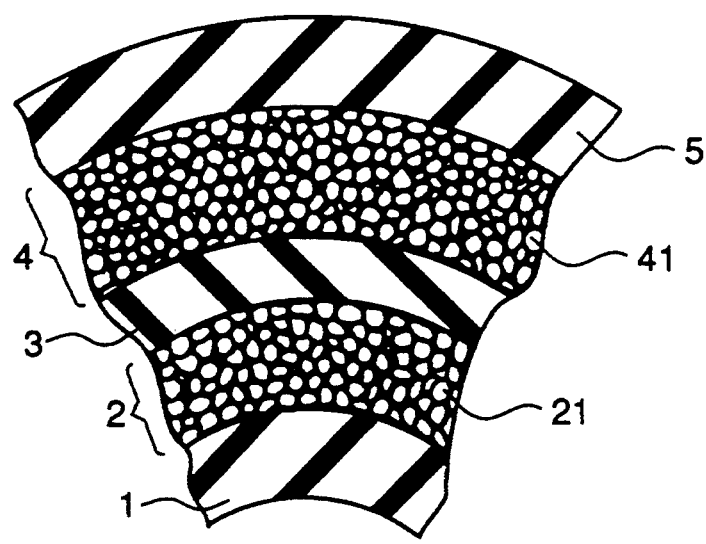
FIG. 1 is a partial cross-sectional view of a first embodiment of the reinforced hose in accordance with the present invention.

FIG. 1 illustrates a first embodiment of a reinforced hose in accordance with the present invention.

Figure 3:
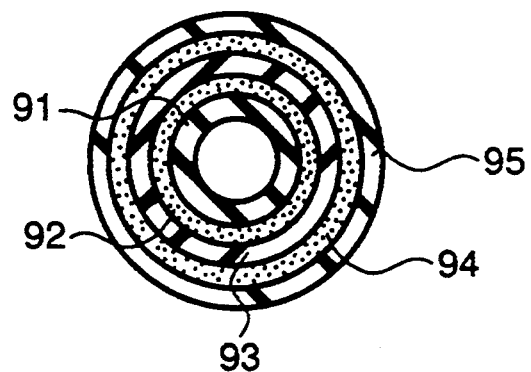
FIG. 3 is a cross-sectional view of a conventional reinforced hose.
Figure 4:
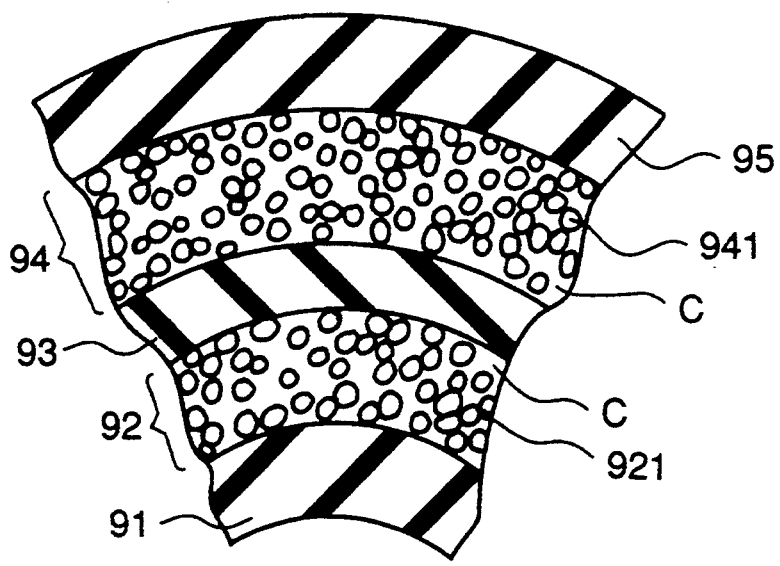
FIG. 4 is an enlarged partial cross-sectional view of the conventional reinforced hose.

A reinforced hose in the first embodiment comprises, as shown in FIG. 1, an inner tube 1 made of rubber, an inner reinforcing layer 2 of at least one strand 21 formed on the inner tube 1, an intermediate layer 3 made of rubber formed on the inner reinforcing layer 2, an outer reinforcing layer 4 of at least one strand 41 formed on the intermediate layer 3, and a covering layer 5 made of rubber formed on the outer reinforcing layer 4. As a whole, the cross-section looks similar to the conventional reinforced hose, as shown in FIG. 3, but as is apparent below the composition of reinforcing layer 4 is significantly different.

The inner tube 1 is made of styrene-butadien rubber (SBR) and is formed by an extruding process. It has a 3.1 mm inner diameter and a thickness of 1.0 to 1.5 mm.

The inner reinforcing layer 2 is made of at least one strand 21 which is spiraled around or braided on the inner tube 1. Each strand 21 is made of aromatic polyamide yarn which has a fineness of about 1,500 denier and a heat shrinkage ratio at dried condition of 0% to about 0.2%. Each strand 21 includes an exemplary 24 pieces of yarn. The aromatic polyamide yarn can be either aramid yarn known as "Kevler" yarn a trademark of Dupont, or methaxylen-diamine nylon yarn except the latter is not sufficient for brake hoses used in antiskid or ABS systems.

The intermediate layer 3 is made of natural-rubber (NR) and is also formed by an extruding process. It has a thickness of 0.3 to 0.5 mm.

The outer reinforcing layer 4 is made of at least one synthetic strand 41 which is spiraled around or braided on the intermediate layer 3. Each strand 41 is made of "Vinylon" (a trademark for polyvinyl alcohol fiber) yarn which has a fineness of about 1,200 denier and a heat shrinkage ratio at dried condition of about 0.5%. Each strand 41 also includes an exemplary 24 pieces of yarn.

The covering layer 5 is made of chloroprene rubber (CR) and is also formed by an extruding process. It has a thickness of 0.8 to 1.2 mm.

Furthermore, the inner reinforcing layer 2 and the outer reinforcing layer 4 are coated by adhesive on both sides. Hence, the inner reinforcing layer 2 is bonded to the inner tube 1 and the intermediate layer 3, and the outer reinforcing layer 4 is bonded to the intermediate layer 3 also and to covering layer 5.

The second embodiment differs from the first embodiment in that the synthetic strands 41 are made of Vinylon yarn which has a fineness of about 1,000 to about 1,500 denier and a heat shrinkage ratio at dried condition of about 1.0%.

The remainder of the structure of the reinforced hose in the second embodiment is identical to that of the first embodiment.

Figure 2:
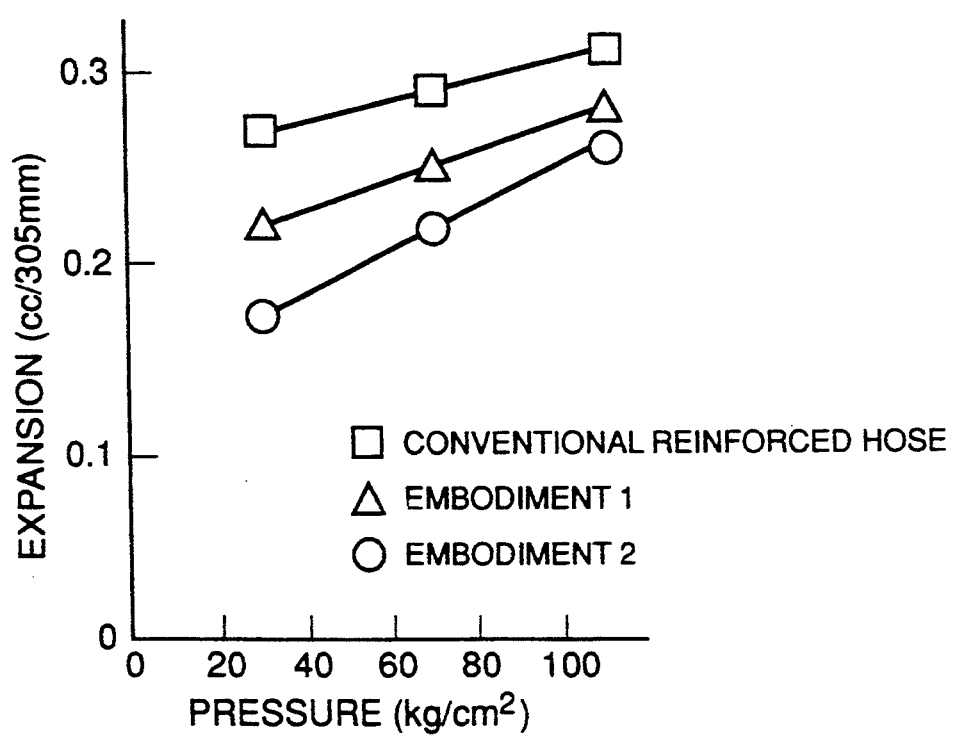
FIG. 2 is a graph showing hose expansion in relation to pressure for both a conventional reinforced hose and those of the present invention.

The expansion of the reinforced hose according to both the first and second embodiments is shown in FIG. 2, the first embodiment by the line containing triangles and the second embodiment by the line containing circles. In addition, the expansion of a conventional reinforced hose having a structure similar to the present invention, but both the inner and outer reinforcing layers being made of aromatic polyamide type yarn, is also shown in FIG. 2 by the line containing squares.

The reinforced hose according to the first embodiment has 2,020 kg/cm² of bursting pressure, and the reinforced hose according to the second embodiment has 2,000 kg/cm² of bursting pressure. Further, the conventional reinforced hose having a structure similar to the present invention, but with both the inner and outer reinforcing layers being made of aromatic polyamide type yarn, has over 2,300 kg/cm² of bursting pressure.

Furthermore, as shown in FIG. 2, the reinforced hoses according to the present invention have smaller expansion for any given pressure than the conventional reinforced hose from a low pressure up to 100 kg/cm² which is usually used. As the outer reinforcing layer of the present invention is not made of aromatic polyamide type yarn, the bursting pressure of the present invention is lower than the conventional reinforced hose having the outer reinforcing layer made of aromatic polyamide type yarn. However, in the present invention, the Vinylon yarn of the outer reinforcing layer 4 is shrunk by the heat of the curing process of the whole hose and compresses the inner reinforcing layer 2 through the intermediate layer 3. As a result, very few gaps are formed in the inner reinforcing layer 2.

Therefore, the reinforced hose of the present invention has good response in a hydraulic circuit, such as an antiskid brake system in which fast response of the servo-valve is required.

Further variations and embodiments will occur to those of ordinary skill in the art and are to be considered within the scope of this invention as defined by the appended claims.

What is claimed is:
1. A reinforced hose, comprising:
an inner tube;
an inner reinforcing layer formed on said inner tube, having a first heat shrinkage rate;
an intermediate layer formed on said inner reinforcing layer;
an outer reinforcing layer formed on said intermediate layer, having a second heat shrinkage rate greater than said first heat shrinkage rate, and
a covering layer formed on said outer reinforcing layer so that upon curing said outer reinforcing layer is shrunk and compresses the inner reinforcing layer and said intermediate layer.

2. A reinforced hose as in claim 1, wherein the first heat shrinkage rate ranges between about 0 and about 0.2% while in a dried condition and the second heat shrinkage rate is at least 0.5% while in a dried condition.

3. A reinforced hose as in claim 1, wherein said inner reinforcing layer is comprised of aromatic polyamide and said outer reinforcing layer is comprised of polyvinyl alcohol fiber.

4. A reinforced hose as in claim 3, wherein said vinylon is in the form of a strand having a denier ranging between 1,000 and 1,500.

5. A reinforced hose as in claim 1, wherein said inner tube is made of rubber.

6. A reinforced hose as in claim 5, wherein said intermediate layer is made of rubber.

7. A reinforced hose as in claim 6, wherein said covering layer is made of rubber.

8. A reinforced hose, comprising:
an inner tube made of rubber;
an inner reinforcing layer formed on said inner tube and comprised of at least one strand of aromatic polyamide, said inner reinforcing layer having a first heat shrinkage rate less than 0.2% at a dried condition;
an intermediate layer, made of rubber, formed on said inner reinforcing layer;
an outer reinforcing layer formed on said intermediate layer and comprised of at least one strand of polyvinyl alcohol fibers, said outer reinforcing layer having a second heat shrinkage rate more than 0.5 % at a dried condition; and
a covering layer formed on said outer reinforcing layer so that upon curing said outer reinforcing layer is shrunk and compresses the inner reinforcing layer and said intermediate layer.

9. A reinforced hose as in claim 8, wherein a covering layer is made of rubber.

10. A reinforced hose as in claim 8, wherein said vinylon strand has a denier ranging between 1,000 and 1,500.

11. A cured reinforced hose, comprising:
an inner tube made of rubber;
an inner reinforcing layer, formed on said inner tube, having a first heat shrinkage rate;
an intermediate layer, made of rubber, formed on said inner reinforcing layer;
an outer reinforcing layer, formed on said intermediate layer, having a second heat shrinkage rate; and
a covering layer, made of rubber, formed on said outer reinforcing layer,
wherein said second heat shrinkage rate is greater than said first heat shrinkage rate, so that as a result of curing said outer reinforcing layer will compress and continue to compress said inner reinforcing layer through the intermediate layer.

* * * * *